United States Patent [19]
Leary et al.

[11] 3,956,210
[45] May 11, 1976

[54] COATING COMPOSITIONS COMPRISING DERIVATIVES OF AUTOXIDIZABLE MALEINIZED FATTY ACIDS

[75] Inventors: Bruce Leary, Frankston; Frederick John Lubbock, Beaumaris, both of Australia

[73] Assignee: Dulux Australia Ltd., Melbourne, Australia

[22] Filed: Nov. 29, 1974

[21] Appl. No.: 528,547

[30] Foreign Application Priority Data
Dec. 11, 1973  Australia.............................. 5952/73

[52] U.S. Cl.............................. 260/21; 260/22 EP; 260/22 CQ
[51] Int. Cl.$^2$........................ C09D 3/52; C09D 3/66
[58] Field of Search............................ 260/21, 22 EP

[56] References Cited
UNITED STATES PATENTS

| | | | |
|---|---|---|---|
| 3,374,208 | 3/1968 | Seiner et al..................... | 260/22 EP |
| 3,383,342 | 5/1968 | Stephens............................. | 260/21 |
| 3,404,018 | 10/1968 | Hicks..................................... | 260/21 |
| 3,437,615 | 4/1969 | Hanson................................. | 260/21 |
| 3,650,997 | 3/1972 | Weisfeld et al....................... | 260/21 |
| 3,661,807 | 5/1972 | Seiner.................................... | 260/21 |
| 3,661,819 | 5/1972 | Koral et al............................ | 260/21 |
| 3,730,926 | 5/1973 | Güldenpfennig................ | 260/22 EP |
| 3,840,483 | 10/1974 | Güldenpfennig....................... | 260/21 |
| 3,878,145 | 4/1975 | Güldenpfennig................ | 260/22 EP |

*Primary Examiner*—Ronald W. Griffin
*Attorney, Agent, or Firm*—Cushman, Darby & Cushman

[57] ABSTRACT

Novel thermosetting coating compositions which comprise a blend of
1. a derivative of an autoxidizable maleinized monocarboxylic fatty acid comprising a mono-ester of a diol and a mono-ester of an alkylene oxide, and
2. a cross-linking agent for the said derivative in the weight ratio of from 70:30 to 95:5 of (1) to (2).

Such coating compositions have high solids contents at normal application viscosities.

3 Claims, No Drawings

COATING COMPOSITIONS COMPRISING DERIVATIVES OF AUTOXIDIZABLE MALEINIZED FATTY ACIDS

This invention relates to novel liquid coating compositions and more particularly to such coating compositions comprising certain derivatives of autoxidizable maleinized fatty acids.

Thermosetting coating compositions, which on curing cross-link to form tough, durable films have been known to the paint industry for a long time. Thermosetting materials such as alkyd resins cross-linkable by reaction with urea- or melamine-formaldehyde resins have been widely used in such compositions. However, concern with atmospheric pollution has led to a reappraisal of these paints, because they usually comprise high proportions of volatile organic solvents (as high as 60% by weight in many cases) which are released into the atmosphere during the curing cycle.

We have now developed novel thermosetting coating compositions which have acceptable application viscosities at very high solids contents. We therefore provide, according to the present invention, a coating composition which comprises a blend of 1. the derivative or substance obtained by reaction of
   a. an autoxidizable maleinized monocarboxylic fatty acid comprising the reaction product of 1 mol of maleic anhydride per mol of monocarboxylic fatty acid with
   b. a diol and an alkylene oxide wherein such substance is characterized by two unreacted hydroxyl groups and one unreacted carboxyl group and is further characterized with a mono-ester linkage of a diol and a mono-ester linkage of an alkylene oxide and (2) a cross-linking agent for the said derivative, in the weight ratio of from 70:30 to 95:5 of (1) to (2).

The autoxidizable maleinized monocarboxylic fatty acids from which our novel compositions are derived comprise equimolar amounts of maleic anhydride and monocarboxylic fatty acids. Suitable autoxidizable fatty acids which will undergo a maleinization reaction with maleic anhydride and the process itself are well known to the art, being described in, for example, "The Chemistry of Organic Film Formers" by D. H. Solomon (1967, John Wiley & Sons Inc.) pp 68–71. Thus the fatty acid may be, for example, a pure 9:11 conjugated diene, e.g. linoleic acid. However, the autoxidizable fatty acids commonly used in such reactions are tall oil fatty acids and acids derived from naturally occurring triglyceride oils, for example, linseed, safflower, soya, sunflower, dehydrated castor and tung oil fatty acids and these are known to consist of mixtures of fatty acids not all of which are dienes. For example, soya oil fatty acids typically consists of a mixture of palmitic, oleic, ricinoleic, linolenic and linoleic acids in varying amounts, a minor proportion of the mixture not entering into a maleinization reaction with maleic anhydride. We have found, however, that these naturally occurring mixtures of fatty acids are quite satisfactory for use in the preparation of the novel products of our invention, the impurities present not appearing to interfere with their useful properties. One consequence of the presence of such impurities is that they will have an effect on the amount of maleic anhydride required in the maleinization reaction. It has been our experience, however, that provided the molar ratio of maleic anhydride to fatty acids, assuming the fatty acids to be a pure diene, is 0.8 — 1.2 to 1.0, this is a sufficiently accurate approximation to the required equimolar ratio.

It is a characteristic of a derivative of this invention that it possesses one carboxyl and two hydroxyl groups and that it comprises both mono-ester of a diol and the other a mono-ester of an alkylene oxide. The diol may be chosen from a wide range of materials known to the art, the choice being restricted only by the end use to which the coating composition incorporating the derivative is to be put. For example, a coating composition which contains a derivative comprising a mono-ester of a relatively simple diol such as, for example, ethylene, propylene or butylene glycol, will suffice for many applications where the coating will not be exposed to harsh or corrosive conditions. A more complex diol, for example, neopentyl glycol, 2,2,4-trimethyl 1,3 pentane diol or 1,4-cyclo-hexane dimethanol will enhance the mechanical properties of the compositions. Mono-esters of the ester diols of the type disclosed in our copending Australian application No. 56066/73 are also comprehended by our invention and useful coating compositions may be prepared from derivatives comprising mono-esters of such diols. The alkylene oxide from which the second mono-ester is formed may be chosen from such common materials as ethylene, propylene and butylene oxides or it may be a more complex type such as those available commercially under the name "Cardura" E (registered trade mark). We have found that, for the best properties, the derivatives should comprise a mono-ester of 2,2-bis (4-hydroxy cyclohexyl)propane or the reaction product of 1 mol of 2, 2-bis (p-hydroxyphenyl)propane with 2 mols of an alkylene oxide, and a mono-ester of a "Cardura" E-type alkylene oxide. Such materials are described in our co-pending Australian patent application No. PB5951 and these are our preferred materials.

The conditions under which diols and alkylene oxides will react with carboxylic acids and acid anhydrides are well known to the art and no special problems are posed in preparing the derivatives of this invention. While in general, very high yields of the desired product are obtained, some by-products can form, for example through variations in the extent of maleinisation of the unsaturated carboxylic acid. It has been our experience that when the derivatives are used, as hereinunder described, as film-forming constituents of a paint, the presence of a small amount of such by-products usually has no significant effect on the expected quality of the paint so-produced.

The derivative may then be used as a film-forming constituent of a paint by blending it with a material with which it will react to form a cross-linked structure. Such a material may be chosen from the wide range of materials known to the art to react with hydroxylated compounds. Suitable cross-linking agents are, for example, low molecular weight alkyl ethers of methylol derivatives of urea and melamine. We have found that, bearing in mind our objective of a high solids coating composition, hexamethoxymethyl melamine is a particularly useful cross-linking agent and is a preferred component of our compositions. The final film properties of the coating compositions may be determined by the choice of the ratio of derivative to cross-linking agent. The lower the proportion of cross-linking agent the more flexible and softer the film, the higher the proportion, the harder and more brittle the film. Thus, a compromise between hardness and flexibility can be chosen for any particular coating composition, and the coating compositions according to this invention can be "tailored" to give the desired film properties for a given application. We have found that, for practical purposes, the ratio of derivative to cross-linking agent should be from 70:30 to 95:5 by weight.

A derivative for inclusion in a coating composition according to the present invention may, for example, be prepared by the following series of steps:

1. An autoxidative mono-carboxylic fatty acid is maleinized.
2. One mol of the maleinized acid is reacted with one mol of a diol.
3. One mol of the resulting compound is reacted with one mol of an alkylene oxide to form a derivative.

The film-forming constituent of a coating composition according to the invention may then be prepared by simply blending suitable proportions of the derivative and a cross-linking agent and this may then be included in a coating composition. Alternatively, the two components may be mixed together with other constituents to give a coating composition. This blend of film-forming constituent and cross-linking agent may be used as the sole film-former of the coating composition, or it may be blended with other film-formers to enhance their film properties or raise their solids contents. Coating compositions using these film-forming constituents as sole film formers have non-volatile contents of typically 80% by weight or more at normal application viscosities. A further advantage is that these coating compositions may be water-based. These water-based compositions which may be prepared by adding sufficient watersoluble base to neutralise the carboxyl groups have reduced solids contents but this is offset by a further reduction in the level of potential pollutants; in some cases pollutants are almost completely absent.

The invention is further illustrated by the following examples all parts being expressed by weight.

EXAMPLE 1

Preparation of a derivative comprising a mono-ester of the reaction product of 2 mol of propylene oxide with 1 mol of 2, 2-bis (p-hydroxy-phenyl)propane (a commercial product called "Bisphenol A" was used) and a mono-ester of propylene oxide, and the preparation therefrom of a coating composition according to the invention.

1. Preparation of Derivative

A. 228.0 parts of "Bisphenol" A was charged to a reaction vessel fitted with stirrer, heating mantle, thermometer and condenser, heated until it melted and the temperature held at 150–160°C.

B. 1.0 parts of "Armeen" DMCD (a tertiary amine catalyst — "Armeen" is a registered trade mark) was added followed by a slow addition of 116.0 parts of propylene oxide in order to maintain a steady reflux at about 150°C, the addition taking place over a period of 3 hours. Heating was continued for a further 30 minutes after the final addition of propylene oxide at which point reaction was substantially complete as demonstrated by examination of the infra-red spectrum of a sample of the contents of the vessel.

C. The temperature was reduced to 130°C and 392.0 parts of maleinized linseed oil fatty acid added. (The maleinized linseed oil fatty acid had 1 maleic anhydride residue per fatty acid molecule and was used as a 97% weight solids solution in xylene). The temperature was raised to 150°C and held there for 30 minutes until ring opening of the maleic anhydride was complete. This was again verified by examination of the infra-red spectrum of a sample of the batch.

D. 0.5 parts of "Armeen" DMCD and 58.0 parts of propylene oxide were added as in Stage B above. The temperature was held at 150°C and the mixture refluxed until the acid value fell to 71 mgm KOH per gm.

The product was a viscous liquid with a solids content of 97% by weight.

2. Preparation of coating composition

The following materials were ball-milled together until a dispersion of particle size 10-15 micron (as measured on a Hegmann gauge) was achieved:

| | | |
|---|---|---|
| Rutile titanium dioxide | 7.29 | parts |
| Barytes | 23.44 | " |
| Silica | 0.26 | " |
| Anti-skinning agent* | 0.20 | " |
| Montmorillionite-based anti-settling agent | 0.15 | " |
| Derivative (97% solids) | 1.97 | " |
| Butyl acetate | 4.00 | " |
| Iso-butanol | 1.00 | " |

*A commercial grade of 2,6-ditertiary butyl 4-methyl phenol was used.

The following components were then stirred until homogeneous:

| | | |
|---|---|---|
| Ball milled mixture (from above) | 38.31 | parts |
| Derivative (thinned to 80% solids by wt. in methyl ethyl ketone) | 14.20 | " |
| Methyl ethyl ketone | 2.00 | " |
| Hexamethoxy methyl melamine* | 3.64 | " |

*A commercial product called "Cymel" 301 (registered trade mark) was used.

The resulting coating composition had nonvolatile content of about 80% solids by weight at spraying viscosity.

EXAMPLE 2

Preparation of a derivative comprising a mono-ester of 2,2,4-trimethyl — 1,3-pentane diol (TMPD) and a mono-ester of propylene oxide, and the preparation therefrom of a coating composition according to the invention.

In the preparation of the derivative, the method of Example 1 was used, but was modified by the deletion of Stages A and B and by the replacement of the materials used in those stages by 146.0 parts of TMPD. This was heated to 130°C and the preparation continued in identical fashion to that of Example 1. The final derivative had an acid value of 85 mgm KOH per gm and a solids content of 88% by weight.

The preparation of a coating composition according to the invention was carried out using the same method and, apart from the derivative, the same materials and quantities as those of Example 1. The weight of derivative used was altered to allow for the difference in the non-volatile content of the derivative prepared above and that of the derivative of Example 1, such that the non-volatile content of the coating composition was identical to that of the composition of Example 1.

The resultant coating composition had a non-volatile content of 80% by weight at spraying viscosity.

EXAMPLE 3

Preparation of a derivative comprising a mono-ester of the reaction product of 2 mol of propylene oxide with 1 mol of 2,2-bis (p-hydroxy phenyl)propane and a mono-ester of a compound of the formula

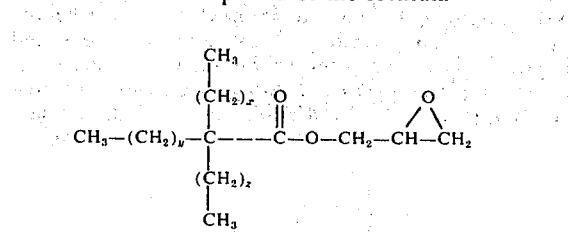

where $x$, $y$, and $z$ (which may be the same or different within the one molecule) are integers and $x + y + z =$ 4–6 inclusive, and preparation therefrom of a coating composition according to the invention.

The compound whose structural formula is depicted hereinabove is available commercially, the particular type in this case being sold under the registered trade mark "Cardura" E. This commercial material is actually a mixture of compounds and no precise formula can therefore be given, but all of the compounds in the mixture fall within the above formula.

The materials and procedure of Example 1 were followed except for the substitution in Stage C of maleinized safflower oil fatty acid (97% solids by weight in xylene with 1 maleic anhydride residue per fatty acid molecule) for the maleinized linseed oil fatty acid and the substitution in Stage D of 245 parts of "Cardura" E for 58 parts of propylene oxide.

The derivative had an acid value of 43 mgm KOH per gm and a solid content of 95.7% by weight.

A coating composition was prepared using the materials and procedure of Example 1 except for the substitution of the derivative prepared above for the Example 1 derivative.

The coating composition had a solids content of about 80% by weight at spraying viscosity.

EXAMPLE 4

Use of the coating compositions of Examples 1 – 3 as undercoats for a thermosetting acrylic enamel and comparative testing with a commercially available automotive-standard epoxy ester primer.

The three coating compositions and the epoxy ester primer were sprayed on to phosphated steel panels at a dry film build 50 micron and baked at 177°C for 30 minutes. The panels were then coated with a 40 micron (dry film build) layer of an acrylic enamel and baked for 30 minutes at 129°C.

The panels were subjected to the following tests:

a. Test to determine adhesion of undercoat to metal

This was carried out in accordance with Test Method BI 6-1, Part A of the Ford Motor Company, one of a series of test methods well known to the art. It involves cross scribing a coated panel, applying a strip of adhesive tape over the cross scribes, pulling the strip away and estimating the adhesion from the amount of paint remaining at the cross scribes.

b. Test to determine adhesion of top coat to undercoat

This was carried out along the lines of Ford Test Method BI6-1, Part B, except that the scribes do not go through to the metal but only to the undercoat.

c. Gravellometer test.

In this test a panel is hung vertically in a gravellometer and then bombarded with 400 g of fresh gravel blown at the panel by an air blast. The air blast has a pressure of 80 p.s.i. and the bombardment takes place over a period of 10 seconds. The paint film on the panel is assessed on a scale of from 1 to 10 where 1 represents no damage and 10 complete removal of the paint film.

d. Impact test

This test was carried out in the manner prescribed by Specification 20/38, part 4 (a) of Chrysler Australia Ltd. The panel is subjected to an impact force of 80 in. lb. and examined for cracking.

e. Flexibility test

This test is identical to that of Ford Test Method BI 5-1. The panel is bent through 180° on a conical mandrel and checked for damage to the film, the film being rated on a flexibility scale of from 1 to 5 with 1 best and 5 worst.

f. Salt spray test

This test was carried out in the manner prescribed by Ford Test Method BI 3-1 except that the panels were exposed for 350 hours. A line is scribed through the paint film to the metal along the longitudinal axis of the panel before testing and at the end of the test, the extent of corrosion is measured from the scribe line.

g. Humidity test.

This test was carried out in the manner prescribed by Ford Test Method BI 4-2 except that the temperature of the test was raised from 43°C to 60°C, thus making the test more severe. The panels were exposed to a high humidity atmosphere in a Cleveland humidity cabinet for 240 hours and the degree of blistering measured by reference to the "Exposure Standards Manual" of the Federation of Societies for Paint Technology. In this Manual, blisters are rated for size by an arbitrary numerical scale from 10 to 0 (10 representing no blistering) and for frequency by a series of ratings which are as follows: D (dense), MD (medium dense), M (medium) and F (few).

The results were as follows:

|  | Epoxy ester primer | Example 1 | Example 2 | Example 3 |
|---|---|---|---|---|
| (a) Adhesion to metal | Excellent | Excellent | Excellent | Excellent |
| (b) Intercoat adhesion | Good | Good | Good | Good |
| (c) Gravellometer | 9½ | 9 | 9 | 8½ |
| (d) Impact | No cracking | Moderate cracking | Slight cracking | Slight cracking |
| (e) Flexibility | 3 | 5 | 1 | 2 |
| (f) Salt spray | 1 | 1 | 1 | 1 |
| (g) Humidity | 8F | 8MD | 8D-6D | 6M |

It can be seen from the results that, overall, the properties of the high performance epoxy ester primer and those of the compositions of three Examples are very similar. The compositions of the Examples have the additional advantage that they can be applied at about 80% solids by weight in contrast with the epoxy ester primer which can be applied at about 45% solids by weight.

We claim:
1. A coating composition which comprises a blend of:
1. the substance obtained by reaction of
   a. an autoxidizable maleinized monocarboxylic fatty acid comprising the reaction product of 1 mol of maleic anhydride per mol of monocarboxylic fatty acid with
   b. a diol and an alkylene oxide wherein said substance is characterized by two unreacted hydroxyl groups and one unreacted carboxyl group and is further characterized by a mono-ester linkage of a diol and a mono-ester linkage of an alkylene oxide and
2. A cross-linking agent for the said substance in the weight ratio of from 70:30 to 95:5 of (1) to (2).

2. A coating composition according to claim 1 wherein the cross-linking agent is hexamethoxymethyl melamine.

3. A coating composition according to claim 1 wherein the diol is selected from the group consisting of 2,2 - bis(4- hydroxycyclohexyl) propane and the reaction product of 1 mol of 2,2 - bis(p-hydroxyphenyl) propane with 2 mols of an alkylene oxide selected from the group consisting of ethylene, propylene and butylene oxide, and wherein the alkylene oxide is selected from the group consisting of ethylene, propylene, butylene oxide and a compound of the formula:

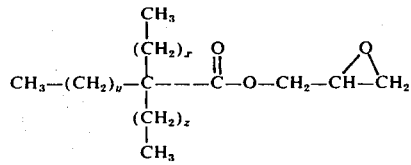

where $x$, $y$, and $z$ are integers and $x + y + z = 4$–$6$ inclusive.

* * * * *